United States Patent Office

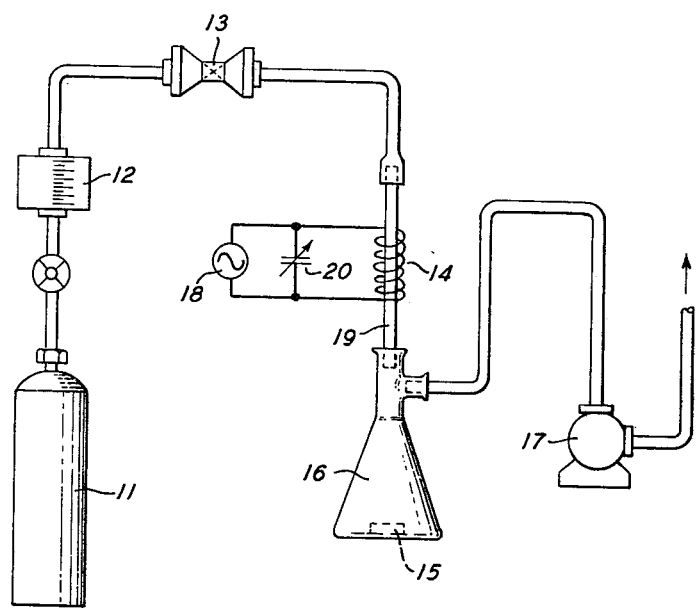

3,493,416
Patented Feb. 3, 1970

3,493,416
BONDING OF POLYPROPYLENE TO ADHESIVES
Ralph H. Hansen, Short Hills, and Harold Schonhorn, New Providence, N.J., assignors to Bell Telephone Laboratories, Incorporated, Murray Hill, N.J., a corporation of New York
Filed Aug. 11, 1966, Ser. No. 571,835
Int. Cl. C08j 1/02; B44d 1/22, 1/44
U.S. Cl. 117—61
4 Claims

ABSTRACT OF THE DISCLOSURE

Polypropylene destined for bonding with an adhesive is bombarded with a stream of excited nitrous oxide, so resulting in a composition retaining the chemical integrity and the electrical characteristics of the bulk material. Bonding with conventional adhesives is subsequently effected by any well known technique.

---

This invention relates to a technique for bonding polypropylene to adhesives. More particularly, the present invention relates to a technique for bonding polypropylene with conventional adhesives.

It has generally been accepted in the adhesives industry that polymers of polypropylene cannot be structurally bonded with any of the commercially available adhesives in the absence of a preliminary surface modification, typically oxidation. Unfortunately, the various techniques proposed by the industry for attaining this end tend to improve one property at the expense of another, so resulting in a composition which is undesirable in many applications.

Recently, a technique for effectively avoiding the prior art limitations was described in copending application Ser. No. 570,220, filed Aug. 4, 1966. The technique described therein involves bombarding hydrocarbon, fluorocarbon and polyamide polymers with a stream of an excited inert gas, so resulting in a composition retaining its original chemical integrity and electrical characteristics as indicated by wettability data. Compositions so treated were found to be capable of bonding with conventional adhesives so as to result in structures evidencing tensile shear strength unsurpassed by those of the prior art. Unfortunately, this technique did not prove satisfactory in conjunction with polypropylene.

In accordance with the present invention, the limitations of the prior art (with regard to polypropylene) are effectively overcome by a technique wherein polypropylene destined for bonding with a conventional adhesive is bombarded with a stream of excited nitrous oxide. The resultant polypropylene compositions have been found to retain their original chemical integrity and electrical characteristics, as indicated by wettability data. Polypropylene treated in the described manner is capable of bonding with conventional adhesives so as to result in structures evidencing a minimum tensile shear strength of at least 1000 p.s.i. at 23° C. and a maximum unsurpassed by those of the prior art.

The present invention has been described largely in terms of the use of epoxy adhesives. However, it will be understood that such description is for convenience only and any commercially available adhesive, such as the polysulfides, polyamides, silicones, etc., is amenable to processing in the described manner.

The invention will be more readily understood by reference to the accompanying drawing wherein:

The figure is a diagram of a typical system used in the practice of the present invention.

The epoxy adhesives employed in the practice of the present invention may be selected from among any of the commercially available materials. However, in order to obtain high strengths, the adhesive must wet the substrate reasonably well, e.g., it should evidence a surface tension less than 50 dynes per centimeter. In order to utilize materials evidencing surface tensions beyond the noted maximum, a surfactant may be employed to reduce the surface tension to an acceptable value. A particularly useful adhesive for the practice of the invention comprises a mixture of diglycidyl ether of bisphenol A and diethylamino-propylamine.

With reference more particularly to the drawing, there is shown a schematic diagram of a typical gas excitation system employed in the practice of the present invention.

Shown in the drawing is a pressurized storage vessel 11 from which nitrous oxide is admitted into the system through flowmeter 12 and needle valve 13. The nitrous oxide next passes into borosilicate glass discharge chamber 14 wherein an electrical discharge is produced as, for example, by inductive reaction with a field generated by a radio frequency oscillator (105–125 volts A.C., 60 cycles). The resultant excited gas then passes over and bombards polypropylene 15 which is situated in cup 16, the exhaust gas emerging therefrom and passing out of the system by means of vacuum pump 17. The electronic system comprises a radio frequency oscillator 18 coupled to the gas system by means of solenoid coil 19. The variable capacitor 20 is provided to adjust the frequency of the generator for maximum power transfer to the gas system.

In the operation of the process, the polypropylene to be treated is wiped with a conventional solvent to remove surface debris and is inserted in cup 16. Following, the system is evacuated by means of pump 17 to a pressure of the order of 0.1 millimeter of mercury. Thereafter, nitrous oxide is introduced into the system at a rate dictated by considerations of the capacity of the pumping system, a partial pressure thereof of approximately one millimeter of mercury being maintained.

Next, the electrical system is turned on and electrical energy transferred directly to a stream of low pressure gas, thereby producing highly excited states as indicated by a characteristic glow observed visually.

The excited nitrous oxide is permitted to bombard the polypropylene for a time period within the range of 1 second to 10 minutes, such range being dictated by practical considerations. There is no maximum upon the duration of bombardment. However, no appreciable improvement in properties is obtained by bombardment beyond one minute. Following bombardment, exhaust vapors are removed from the system by means of pump 17.

It will be appreciated by those skilled in the art that the excitation procedure described is merely exemplary and any procedure of the prior art may be utilized for this purpose, as for example, the use of a Tesla coil, etc.

Following bombardment, the polypropylene is removed from the sample cup, the electrical properties desirably determined and bonding with a conventional adhesive effected.

For purposes of exposition, the use of an epoxy adhesive is described.

The expoxy adhesive is applied uniformly to the surface of the treated polypropylene and the coated polymer maintained at a temperature ranging from room temperautre to a point just below the melting temperature thereof for a time period sufficient to permit curing of the epoxy compound, thereby forming a structural bond between the polypropylene and the adhesive.

An example of the present invention is described in detail below. The example is included merely to aid in the understanding of the invention and variations may

EXAMPLE

A 1″ x 3″ sample of polypropylene, obtained from commercial sources, was washed with acetone, dried in air and inserted in an apparatus similar to that shown in the figure. Following, the system was pumped down to a pressure of the order of 0.1 millimeter of mercury and nitrous oxide introduced into the system at a rate of four cubic centimeters per minute, a partial pressure of approximately one millimeter of mercury being maintained. The electrical system was then activated, a characteristic pink glow appearing at 110 volts. The excited nitrous oxide was permitted to bombard the polypropylene for one second, exhaust gases being removed from the system. Following, the polypropylene was removed from the system and the electrical properties and wettability thereof measured. The electrical properties (surface resistivity) and wettability were found to be unchanged in both the untreated and treated compositions.

An epoxy resin, diglycidyl ether of bisphenol A was selected for use in preparing an epoxy adhesive. The resin, obtained from commercial sources, evidenced an epoxy equivalent weight of 179, a total chloride content less than 0.1 percent by weight, and a viscosity of 6,400 centipoises at 25° C.

Diethylaminopropylamine, obtained from commercial sources, was distilled under nitrogen through a six inch Vigreux column and the first fraction discarded. The product, distilling at 68° centigrade and 26 millimeters pressure was stored in a dark container prior to use.

An epoxy adhesive was prepared by mixing 100 parts by weight of the above described resin with seven parts by weight of the diethylaminopropylamine. The mixture was thoroughly stirred until uniform and applied immediately to the surface of the polypropylene. The resultant assembling was maintained at a temperature of 70° centigrade for approximately 16 hours.

In order to determine tensile shear strengths of the resultant structures, composites were prepared in accordance with the following procedure.

Metal tensile shear adherends, 5″ x 1″ x 1/16″ of 2024–T3 aluminum, obtained from commercial sources were selected. The surface of the aluminum adherends was prepared by vapor degreasing in trichloroethylene in accordance with conventional procedures and, subsequently etching for seven minutes at 65° centigrade in a solution comprising one part by weight sodium dichromate, thirty parts by weight water and ten parts by weight of 95 percent sulphuric acid. Following etching, the adherends were rinsed for five minutes in running tap water, for one minute in running distilled water and then dried in a forced air oven at 60° centigrade. The adherends were stored in desiccators and removed just prior to use.

For the measurement of tensile shear strengths, composite test pieces comprising aluminum-epoxy adhesive-polypropylene-epoxy adhesive-aluminum were prepared for bonding in a device designed to maintain a ½″ overlap, the thickness of the epoxy adhesive being maintained constant by insertion of a piece of 0.003″ diameter wire in each glue line between the aluminum and the polypropylene. Bonding of the aluminum to the epoxy adhesive-polypropylene structure was effected at a pressure of 20 pounds per square inch by placing the composites in forced air ovens maintained at 70° centigrade for 16 hours. The bonded structures were tested in accordance with ASTM–D 1002–53T, except that the strain rate was 0.1″ per minute. The tensile shear strength of the structure was approximately 2800 pounds per square inch at 23° centigrade.

What is claimed is:

1. A method for forming a seal between polypropylene and an adhesive, the said polypropylene having been subjected to a stream of nitrous oxide excited by means of an electrodeless electrical discharge at subatmospheric pressures for a time period of at least one second which comprises positioning the said adhesive upon said polypropylene and maintaining the resultant assembly at a temperature below the melting point of said polypropylene for a time period sufficient to cure the said adhesive.

2. A method in accordance with claim 1 wherein said adhesive is an epoxy adhesive.

3. A method of forming a seal between polypropylene and an adhesive which comprises the steps of subjecting polypropylene to a stream of nitrous oxide excited by means of an electrodeless electrical discharge at subatmospheric pressures for a time period of at least one second, positioning the said adhesive upon said polypropylene and maintaining the resultant assembly at a temperature below the melting point of said polypropylene for a time period sufficient to cure the said adhesive.

4. A method in accordance with claim 3 wherein said adhesive is an epoxy adhesive.

References Cited

UNITED STATES PATENTS

| | | | |
|---|---|---|---|
| 2,715,076 | 8/1955 | Wolinski | 117—47 X |
| 2,715,077 | 8/1955 | Wolinski | 117—47 X |
| 2,801,446 | 8/1957 | Wolinski | 117—47 X |
| 3,255,099 | 6/1966 | Wolinski | 117—47 X |
| 3,296,011 | 1/1967 | McBride et al. | 117—47 |
| 3,020,223 | 2/1962 | Manion | 204—177 |
| 3,309,299 | 3/1967 | Mantell | 204—165 |
| 3,387,991 | 6/1968 | Erchak | 117—138.8 |

WILLIAM D. MARTIN, Primary Examiner

B. D. PLANALTO, Assistant Examiner

U.S. Cl. X.R.

117—47, 106, 122, 138.8